United States Patent
Kawata et al.

(10) Patent No.: US 10,007,878 B2
(45) Date of Patent: Jun. 26, 2018

(54) OPERATION PLAN DECISION METHOD AND OPERATION PLAN DECISION SYSTEM

(71) Applicant: YOKOGAWA ELECTRIC CORPORATION, Musashino-shi, Tokyo (JP)

(72) Inventors: Mika Kawata, Musashino (JP); Kenichi Ohara, Musashino (JP); Mitsunori Fukuzawa, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 949 days.

(21) Appl. No.: 14/465,195

(22) Filed: Aug. 21, 2014

(65) Prior Publication Data

US 2015/0058270 A1   Feb. 26, 2015

(30) Foreign Application Priority Data

Aug. 23, 2013  (JP) .................. 2013-173313
Mar. 26, 2014  (JP) .................. 2014-064787

(51) Int. Cl.
   *G06N 5/02*     (2006.01)
   *G06Q 10/06*    (2012.01)

(52) U.S. Cl.
   CPC ......... *G06N 5/022* (2013.01); *G06Q 10/0637* (2013.01)

(58) Field of Classification Search
   None
   See application file for complete search history.

(56) References Cited

U.S. PATENT DOCUMENTS

| 5,467,265 A | 12/1995 | Yamada et al. |
| 6,189,132 B1* | 2/2001 | Heng .................. G06F 17/5081 716/122 |
| 2002/0029370 A1* | 3/2002 | Michalewicz ......... G06N 5/003 716/136 |
| 2009/0271241 A1 | 10/2009 | Pratt |
| 2012/0078645 A1 | 3/2012 | Drew et al. |
| 2013/0338842 A1 | 12/2013 | Inoue et al. |

(Continued)

FOREIGN PATENT DOCUMENTS

| CN | 101813941 A | 8/2010 |
| DE | 4404272 A1 | 8/1994 |
| JP | 06-236202 A | 8/1994 |

(Continued)

OTHER PUBLICATIONS

Extended European Search Report dated Oct. 6, 2014 issued by European Patent Office in counterpart European application No. 14180901.2.

*Primary Examiner* — Pualinho E Smith

(74) *Attorney, Agent, or Firm* — Sughrue Mion, PLLC

(57) ABSTRACT

An operation plan decision method includes deriving an feasible solution by using a constraint violation minimization model, updating candidates for an optimum solution and adding the updated candidates to a candidate list by taking the derived feasible solution, as an initial value of a candidate for the optimum solution, and by using a time cross-section division model that is obtained by dividing an optimization model for each time cross-section, and selecting the optimum solution from the candidate list to which the updated candidates are added.

12 Claims, 10 Drawing Sheets

(56) References Cited

U.S. PATENT DOCUMENTS

2014/0249882 A1* 9/2014 Li .................... G06Q 10/06313
　　　　　　　　　　　　　　　　　　　　　705/7.23
2015/0058270 A1* 2/2015 Kawata .................. G06N 5/022
　　　　　　　　　　　　　　　　　　　　　706/46

FOREIGN PATENT DOCUMENTS

| JP | 09-300180 A | 11/1997 |
| JP | 11-272748 A | 10/1999 |
| JP | 2010-237745 A | 10/2010 |
| WO | 2012118067 A1 | 9/2012 |

* cited by examiner

FIG. 3

[SUPPLY-DEMAND BALANCE CONSTRAINT]

| NAME OF EQUIPMENT | NAME OF ARTIFICIAL VARIABLE | 9 | 10 | 11 | 12 | 13 | 14 | 15 | 16 |
|---|---|---|---|---|---|---|---|---|---|
| POWER DEMAND | ARTIFICIAL VARIABLE (BALANCE CONSTRAINT: SHORT SUPPLY) | 0 | 293691 | 294503 | 292662 | 291679 | 318667 | 319556 | 0 |
|  | ARTIFICIAL VARIABLE (BALANCE CONSTRAINT: EXCESSIVE SUPPLY) | 0 | 0 | 0 | 0 | 0 | 0 | 0 | 0 |
| SUD DEMAND 1 | ARTIFICIAL VARIABLE (BALANCE CONSTRAINT: SHORT SUPPLY) | 0 | 0 | 0 | 0 | 0 | 0 | 0 | 0 |
|  | ARTIFICIAL VARIABLE (BALANCE CONSTRAINT: EXCESSIVE SUPPLY) | 0 | 0 | 0 | 0 | 0 | 0 | 0 | 0 |
| HP DEMAND 1 | ARTIFICIAL VARIABLE (BALANCE CONSTRAINT: SHORT SUPPLY) | 0 | 0 | 0 | 0 | 0 | 0 | 0 | 0 |
|  | ARTIFICIAL VARIABLE (BALANCE CONSTRAINT: EXCESSIVE SUPPLY) | 0 | 0 | 0 | 0 | 0 | 0 | 0 | 0 |
| MP DEMAND 1 | ARTIFICIAL VARIABLE (BALANCE CONSTRAINT: SHORT SUPPLY) | 0 | 0 | 0 | 0 | 0 | 0 | 0 | 0 |
|  | ARTIFICIAL VARIABLE (BALANCE CONSTRAINT: EXCESSIVE SUPPLY) | 0 | 0 | 0 | 0 | 0 | 0 | 0 | 0 |
| LP DEMAND 1 | ARTIFICIAL VARIABLE (BALANCE CONSTRAINT: SHORT SUPPLY) | 0 | 0 | 0 | 0 | 0 | 0 | 0 | 0 |
|  | ARTIFICIAL VARIABLE (BALANCE CONSTRAINT: EXCESSIVE SUPPLY) | 0 | 0 | 0 | 0 | 0 | 0 | 0 | 0 |

CONFIRM AMOUNT OF DEMAND

| INCREMENTAL INTERVAL | 9 | 10 | 11 | 12 | 13 | 14 | 15 | 16 |
|---|---|---|---|---|---|---|---|---|
| AMOUNT OF DEMAND [kWh] | 39,872 | 396,324 | 397,136 | 395,295 | 394,312 | 421,300 | 422,189 | 42,029 |

AMOUNT OF DEMAND IS ONE DIGIT LARGER THAN THOSE OF TIME SLOTS BEFORE AND AFTER MARKED TIME SLOTS

FIG. 4

| TIME | 00:00 | 01:00 | 02:00 | 03:00 | 04:00 | 05:00 | 06:00 | 07:00 | 08:00 | 09:00 | 10:00 | 11:00 | 12:00 | 13:00 | 14:00 |
|---|---|---|---|---|---|---|---|---|---|---|---|---|---|---|---|
| FEASIBLE SOLUTION | | COST 100 | COST 100 | COST 100 | COST 100 | | | | | | | COST 100 | COST 100 | COST 100 | |
| SOLUTION CANDIDATE 1 | COST 95 | COST 0 | COST 95 | COST 95 | COST 95 | COST 0 | COST 0 | COST 95 | COST 0 | COST 100 | COST 95 | COST 100 | COST 100 | COST 95 | COST 0 |
| SOLUTION CANDIDATE 2 | COST 90 | COST 0 | COST 90 | COST 0 | COST 0 | COST 95 | COST 95 | COST 90 | COST 90 | COST 95 | COST 90 | COST 95 | COST 0 | COST 90 | COST 90 |
| SOLUTION CANDIDATE 3 | COST 85 | COST 0 | COST 0 | COST 85 | COST 0 | COST 0 | COST 0 | COST 85 | COST 0 | COST 85 | COST 0 | COST 85 | COST 0 | COST 0 | COST 85 |

MINIMUM OPERATION TIME PERIOD CONSTRAINT : 5H
MINIMUM STOP TIME PERIOD CONSTRAINT : 5H
START-UP STOP

| OPTIMUM SOLUTION | COST 85 | COST 0 | COST 90 | COST 85 | COST 95 | COST 0 | COST 85 | COST 0 | COST 0 | COST 95 | COST 85 | COST 0 | COST 0 | COST 90 | COST 85 |

VIOLATION OF MINIMUM OPERATION TIME PERIOD CONSTRAINT
VIOLATION OF MINIMUM STOP TIME PERIOD CONSTRAINT

| OPTIMUM SOLUTION | COST 85 | COST 100 | COST 90 | COST 85 | COST 95 | COST 0 | COST 0 | COST 0 | COST 0 | COST 95 | COST 85 | COST 100 | COST 100 | COST 90 | COST 85 |

VIOLATION OF MINIMUM OPERATION TIME PERIOD CONSTRAINT

FIG. 10

| | B | C-AZ | BA |
|---|---|---|---|
| 1 | HEAVY OIL BOILER | EQUIPMENT RATED VALUE INPUT COLUMN (MANDATORY) | |
| 2 | | | |
| 3 | [INPUT AND OUTPUT RATED VALUE] | | |
| 4 | MINIMUM VAPOR OUTPUT [ton/h] | | MINIMUM OUTPUT VALUE AT OPERATION OF MACHINE |
| 5 | MAXIMUM VAPOR OUTPUT [ton/h] | | MAXIMUM OUTPUT VALUE AT OPERATION OF MACHINE |
| 6 | MAXIMUM FLOW RATE OF HEAVY OIL [L/h] | | MAXIMUM INPUT VALUE AT OPERATION OF MACHINE |
| 7 | CONTINUOUS BLOW RATE | | ARBITRARILY SET TO 0 OR 1 |
| 8 | BLOW | 0.05 | AMOUNT OF CONTINUOUS BLOW = AMOUNT OF OUTPUT VAPOR × CONTINUOUS BLOW RATE (RANGE OF VALUE: 0 – 1) |
| 9 | BLOW COOLING COEFFICIENT [ton/h] | 2 | AMOUNT OF BLOW COOLING = AMOUNT OF CONTINUOUS BLOW × BLOW COOLING COEFFICIENT [ton/H] |
| 10 | WATER CONSUMPTION (BLOW) CALCULATION DETERMINATION FLAG | 0 | CONSTRAINT CONDITION SET COLUMN (ARBITRARY) |
| 11 | | | |
| 24 | [OPERATION CONDITION] | | |
| 25 | PRIORITY | | AVAILABLE ONLY WHEN PRIORITY CONSTRAINT IS APPLIED (BY GBOX) |
| 26 | STAGE INCREASE SET VALUE [%] | 100 | AVAILABLE ONLY WHEN STAGE INCREASE CONSTRAINT IS APPLIED (BY GBOX) |
| 27 | MINIMUM OPERATION TIME PERIOD [h] | 0 | ONCE MACHINE STARTS, IT HAS TO OPERATE FOR AT LEAST MINIMUM TIME PERIOD |
| 28 | MINIMUM STOP TIME PERIOD [h] | 0 | ONCE MACHINE STOPS, IT HAS TO STOP FOR AT LEAST MINIMUM TIME PERIOD |
| 29 | START-UP TIME PERIOD [h] | 0 | START-UP TIME OF MACHINE |
| 30 | START-UP PENALTY [kW] | 0 | ELECTRIC POWER LOSS AT START-UP OF MACHINE |
| 31 | STOP PENALTY [kW] | 0 | ELECTRIC POWER LOSS AT STOP OF MACHINE |
| 32 | UNIT MAINTENANCE COST (YEN/kW) | 0 | UNIT MAINTENANCE COST CORRESPONDING TO OUTPUT CAPACITY OF MACHINE |
| 33 | OPERATION SIGNAL | 0 | 0: UNDER SUSPENSION AND 1: UNDER OPERATION |
| 34 | INOPERABLE SIGNAL | 0 | 0: OPERABLE AND 1: INOPERABLE |
| 35 | CONTINUOUS OPERATION TIME PERIOD [h] | 0 | CONTINUOUS OPERATION TIME PERIOD AFTER START-UP OF MACHINE (0 WHEN OPERATION SIGNAL IS 0) |
| 36 | CONTINUOUS STOP TIME PERIOD [h] | 0 | CONTINUOUS STOP TIME PERIOD AFTER STOP OF MACHINE (0 WHEN OPERATION SIGNAL IS 1) |

| 37 | TIME | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | TOTAL |
|---|---|---|---|---|---|---|---|---|---|---|---|---|---|---|---|---|---|---|---|---|---|---|---|---|---|---|
| 38 | SEED SET | | | | | | | | | | | | | | | | | | | | | | | | | 0 |
| 39 | | 0: STOP (NO EXCEPTION), 1: START-UP (NO EXCEPTION), AND BLANK: PLAN DEPENDANT | | | | | | | | | | | | | | | | | | | | | | | | |
| 40 | | | | | | | | | | | | | | | | | | | | | | | | | | |
| 41 | [OPERATION CONDITION] | | | | | | | | | | | | | | | | | | | | | | | | | |
| 42 | TIME | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | TOTAL |
| 43 | ON/OFF | | | | | | | | | | | | | | | | | | | | | | | | | 0 |
| 44 | | | | | | | | | | | | | | | | | | | | | | | | | | |
| 45 | [AMOUNT OF INPUT AND OUTPUT, AND ELECTRIC POWER CONSUMPTION] | | | | | | | | | | | | | | | | | | | | | | | | | |
| 46 | TIME | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | TOTAL |
| 47 | AMOUNT OF HEAVY OIL CONSUMPTION [m3] | | | | | | | | | | | | | | | | | | | | | | | | | 0 |
| 48 | AMOUNT OF VAPOR PRODUCTION [TON] | | | | | | | | | | | | | | | | | | | | | | | | | 0.00 |
| 49 | WATER CONSUMPTION (BLOW) [m3] | | | | | | | | | | | | | | | | | | | | | | | | | 0.00 |
| 50 | ELECTRIC POWER CONSUMPTION OF MAIN MACHINE BODY [kWh] | | | | | | | | | | | | | | | | | | | | | | | | | 0 |
| 51 | ELECTRIC POWER CONSUMPTION OF MACHINE ACCESSORY [kWh] | | | | | | | | | | | | | | | | | | | | | | | | | 0 |
| 52 | ELECTRIC POWER CONSUMPTION OF COOLING TOWER FAN [kWh] | | | | | | | | | | | | | | | | | | | | | | | | | 0 |

OPTIMIZATION CALCULATION RESULT OUTPUT COLUMN (AUTOMATIC)

OPERATION PLAN DECISION METHOD AND OPERATION PLAN DECISION SYSTEM

CROSS-REFERENCE TO RELATED APPLICATION(S)

The present application claims the benefit of priorities of Japanese Patent Application No. 2013-173313 filed on Aug. 23, 2013 and Japanese Patent Application No. 2014-064787 filed on Mar. 26, 2014. The disclosures of the applications are incorporated herein by reference.

BACKGROUND

Technical Field

The present invention relates to an operation plan decision method in which an operation plan is determined to satisfy constraint conditions, and the like.

Related Art

Supply-demand cooperation is initiated to suppress the usage of fossil fuels by reusing byproducts such as byproduct gas discharged in the process of production as a fuel in energy supply equipment, and the supply-demand cooperation has drawn public attention in recent years. In the application of the supply-demand cooperation, unlike countermeasures of energy saving for a piece of energy supply equipment in the related art, the application of countermeasures of energy saving extends to a plurality of factories including production equipment, and various byproducts are used. Accordingly, an operation of a plant becomes large-scale and complicated. For this reason, there is a growing need for a solution contributing to energy saving and cost saving.

A start and stop signal (0-1 integer variable) and the amount of input and output (continuous variable) of equipment are calculated to acquire an optimum operation plan for the realization of energy saving and cost saving. Accordingly, a mathematical programming method referred to as a mixed integer linear programming (MILP) method is widely used as an optimization method. The MILP method is an explicit solution method in which the entire combinations of the integer variables is searched for, and the amount of search time increases exponentially when the number of equipment increases, or the unit of scheduling changes. Accordingly, when an optimization model becomes large-scale and complicated, there is a problem in that a vast amount of calculation time period is required, and an optimum solution cannot be obtained.

Hereinafter, an example of a mixed integer linear programming model of the related art will be described.

Objective function [Expression 1]

$$\sum_{t \in Time} \sum_{e \in Energy} \sum_{f \in Facility} (C_{t,f}^e)^T \cdot X_{t,f}^e \to \text{Minimize}$$

Equipment characteristics $$Y_{t,f}^e = \eta_f^e \cdot X_{t,f}^e + \varepsilon_f^e \cdot \delta_{t,f}$$

$$\delta_{t,f} \in \{0, 1\}$$

Constraint conditions (closed at time): in sequence, supply-demand balance constraint, output upper and lower limit constraints, and non-negative constraint (an example)

$$\sum_f Y_{t,f}^e \geq \text{Demand}_t^e$$

$$\text{Min}Y_f^e \cdot \delta_{t,f} \leq Y_{t,f}^e \leq \text{Max}Y_{t,f}^e \cdot \delta_{t,f}$$

$$X_{t,f}^e, Y_{t,f}^e \geq 0$$

Constraint conditions (across time): minimum operation time period constraint (an example)

$$(N_f - 1)(\delta_{t,f} - \delta_{t-1,f}) \leq \sum_{u=t+1}^{t+N_f-1} \delta_{u,f}$$

Continuous variable:
X: equipment input energy, Y: equipment output energy
Integer variable:
δ: equipment operation signal (On/Off)
Parameter:
C: unit cost, η: coefficient of performance (COP), ε: the amount of bias, Demand: the amount of demand, MinY: minimum output rating, MaxY: maximum output rating, and N: minimum period of operation
Subscript:
t: time step (examples: 1, 2, 3, . . . , 24), e: the type of energy, f: the number of equipment The mixed integer linear programming model has the following four characteristics.

(1) In the objective function, the cost (or the amount of $CO_2$ discharge) of energy consumed by the equipment is defined.

(2) A characteristic expression using the amount of input and output energy and the coefficients of performance for the equipment is defined (equipment characteristics).

(3) A balance constraint of the amount of energy supplied to demand sides, or operation constraints of the equipment are defined (constraint conditions).

(4) It is possible to deal with variables of a different type in the amount of input and output (the continuous variable) and the operation signal (the integer variable).

In the mixed integer linear programming (MILP) method, an optimum solution is derived in a time series, in which the total cost (or the amount of $CO_2$ discharge) of energy consumed by a group of equipment of the plant becomes minimized while the characteristic expression and the constraint conditions are satisfied.

PRIOR ART DOCUMENT

Patent Document

[Patent Document 1] JP-A-2010-237745
[Patent Document 2] JP-A-11-272748
[Patent Document 3] JP-A-09-300180
[Patent Document 4] JP-A-06-236202

The mixed integer linear programming (MILP) method proposes approaches in which a plurality of the optimization methods is combined together so as to reduce the calculation time period, and in any one of the approaches, the calculation time period can be reduced by either a small amount or a large amount. However, even after the optimization calculation is finished, it is still not possible to resolve a probability of being unable to obtain even an feasible solution, putting aside an optimum solution.

When a violation of constraints occurs during the optimization calculation, it is necessary to estimate the identification of a spot (target equipment, the type of a constraint, or a time slot) of a cause based on an error number indicated by an optimization engine or know-how built up to now. Accordingly, there is also a problem in that the identification of the spot of the cause requires a vast amount of man-hours to the extent that the model is large-scale and complicated, and that the more professional knowledge than those in the mixed integer linear programming (MILP) method is required to combine together the plurality of methods.

SUMMARY

Exemplary embodiments of the invention provide an operation plan decision method and an operation plan decision system which can acquire the executable optimum solution in a short time period.

An operation plan decision method in which an operation plan is determined to satisfy constraint conditions, according to an exemplary embodiment, comprises: executed by a computer, deriving an feasible solution by using a constraint violation minimization model;

updating candidates for an optimum solution and adding the updated candidates to a candidate list by taking the derived feasible solution, as an initial value of a candidate for the optimum solution, and by using a time cross-section division model that is obtained by dividing an optimization model for each time cross-section; and selecting the optimum solution from the candidate list to which the updated candidates are added.

In the operation plan decision method, since the feasible solution is derived by using the constraint violation minimization model, the derived feasible solution is taken as an initial value of a candidate for the optimum solution, the candidates for the optimum solution are updated by using the time cross-section division model that is obtained by dividing the optimization model for each time cross-section, and the updated candidates are added to the candidate list, the executable optimum solution is acquired in a short time period.

The operation plan decision method may comprise:
identifying a spot of a constraint violation for an infeasible solution when the feasible solution cannot be derived.

When the feasible solution cannot be derived, the execution of the candidate updating may be stopped.

The operation plan decision method may comprise:
preparing an energy flow diagram indicative of the flow of energy between equipment, based on figures indicative of the equipment;

generating a parameter input screen to correspond to the figures, and receiving parameters corresponding to the figures from the generated parameter input screen; and generating the constraint violation minimization model, the time cross-section division model, an integer condition relaxation model, and an optimum solution selection model based on the parameters corresponding to the figures, which are received via the parameter input screen.

The operation plan decision method may comprise:
outputting the selected optimum solution.

The selected optimum solution may be output at a predetermined position on the parameter input screen.

An operation plan decision system in which an operation plan is determined to satisfy constraint conditions, according to an exemplary embodiment, comprises:

an feasible solution deriving module configured to derive an feasible solution by using a constraint condition minimization model;

a candidate updating module configured to update candidates for an optimum solution and adding the updated candidates to a candidate list by taking the feasible solution derived by the feasible solution deriving module, as an initial value of a candidate for the optimum solution, and by using a time cross-section division model that is obtained by dividing an optimization model for each time cross-section; and an optimum solution selection module configured to select the optimum solution from the candidate list obtained by the candidate updating module.

In the operation plan decision system, since the feasible solution is derived by using the constraint violation minimization model, the derived feasible solution is taken as an initial value of a candidate for the optimum solution, the candidates for the optimum solution are updated by using the time cross-section division model that is obtained by dividing the optimization model for each time cross-section, and the updated candidates are added to the candidate list, the executable optimum solution is acquired in a short time period.

The operation plan decision system may comprise:
a constraint violation identification module configured to identify a spot of a constraint violation for an infeasible solution when the feasible solution cannot be derived by the feasible solution deriving module.

When the feasible solution cannot be derived by the feasible solution deriving module, the execution of the candidate updating module may be stopped.

The operation plan decision system may comprise:
an energy flow diagram preparation module configured to prepare an energy flow diagram indicative of the flow of energy between equipment, based on figures indicative of the equipment;

a parameter input module configured to generate a parameter input screen to correspond to the figures, and receiving parameters corresponding to the figures from the generated parameter input screen; and a model generation module configured to generate the constraint violation minimization model, the time cross-section division model, an integer condition relaxation model, and an optimum solution selection model based on the parameters corresponding to the figures, which are received via the parameter input screen.

The operation plan decision system may comprise:
an optimum solution output module configured to output the optimum solution selected by the optimum solution selection module.

The optimum solution output module may output the optimum solution at a predetermined position on the parameter input screen.

In the operation plan decision method according to the embodiments of the present invention, since the feasible solution is derived by using the constraint violation minimization model, the derived feasible solution is taken as an initial value of a candidate for the optimum solution, the candidates for the optimum solution are updated by using the time cross-section division model that is obtained by dividing the optimization model for each time cross-section, and the updated candidates are added to the candidate list, the executable optimum solution is acquired in a short time period.

In the operation plan decision system according to the embodiments of the present invention, since the feasible solution is derived by using the constraint violation minimization model, the derived feasible solution is taken as an initial value of a candidate for the optimum solution, the candidates for the optimum solution are updated by using the time cross-section division model that is obtained by dividing the optimization model for each time cross-section, and the updated candidates are added to the candidate list, the executable optimum solution is acquired in a short time period.

BRIEF DESCRIPTION OF THE DRAWINGS

FIG. 3 is a diagram illustrates an example of procedures of when a constraint violation spot is identified.

FIG. 4 is a diagram illustrating an example of a solution candidate list.

FIG. 10 illustrates an example of an input work sheet generated by a parameter input module 21.

DETAILED DESCRIPTION

First Embodiment

Hereinafter, a first embodiment of an operation plan decision system according to the present invention will be described.

The present invention is intended to provide an operation plan that functions as a host system of a control and monitoring system targeting a heavy and chemical industrial plant having energy supply equipment such as in-house power generation equipment, and that contributes to energy saving and cost saving of the plant.

The present invention is intended to provide an algorithm that models the plant which becomes large-scale and complicated because of the expansion of an energy saving target range, for example, particularly, supply-demand cooperation in which production equipment and supply equipment are integrated, and that can execute in a short time period of an optimum scheduling consisting of start-stop or input-output of many groups of equipment, while warranting feasibility.

The present invention is intended to provide a high-speed optimum algorithm that warrants feasibility of a large-scale and complicated plant model, an optimum solution of which cannot be obtained by a method of the related art, by combining together a function of searching for an feasible solution, a function of dividing an optimization model for each time cross-section, a function of updating and listing candidates for the optimum solution, and a function of selecting the optimum solution from the listed candidates. According to the embodiment of the present invention, when an optimization calculation is finished, the optimum solution is certainly derived to satisfy the entirety of constraint conditions, and the amount of search time of an integer variable is considerably suppressed, and thus a calculation time period can be reduced. Furthermore, when a violation of constraints occurs, it is possible to clarify and identify a spot of cause quickly.

An operation plan decision system according to the embodiment of the present invention is configured to include a plurality of optimization methods (optimization processes). The operation plan decision system uses a modified model of a mixed integer linear programming model, and adopts an algorithm which is compiled by taking the maintainability of the model into consideration.

Figure 1:
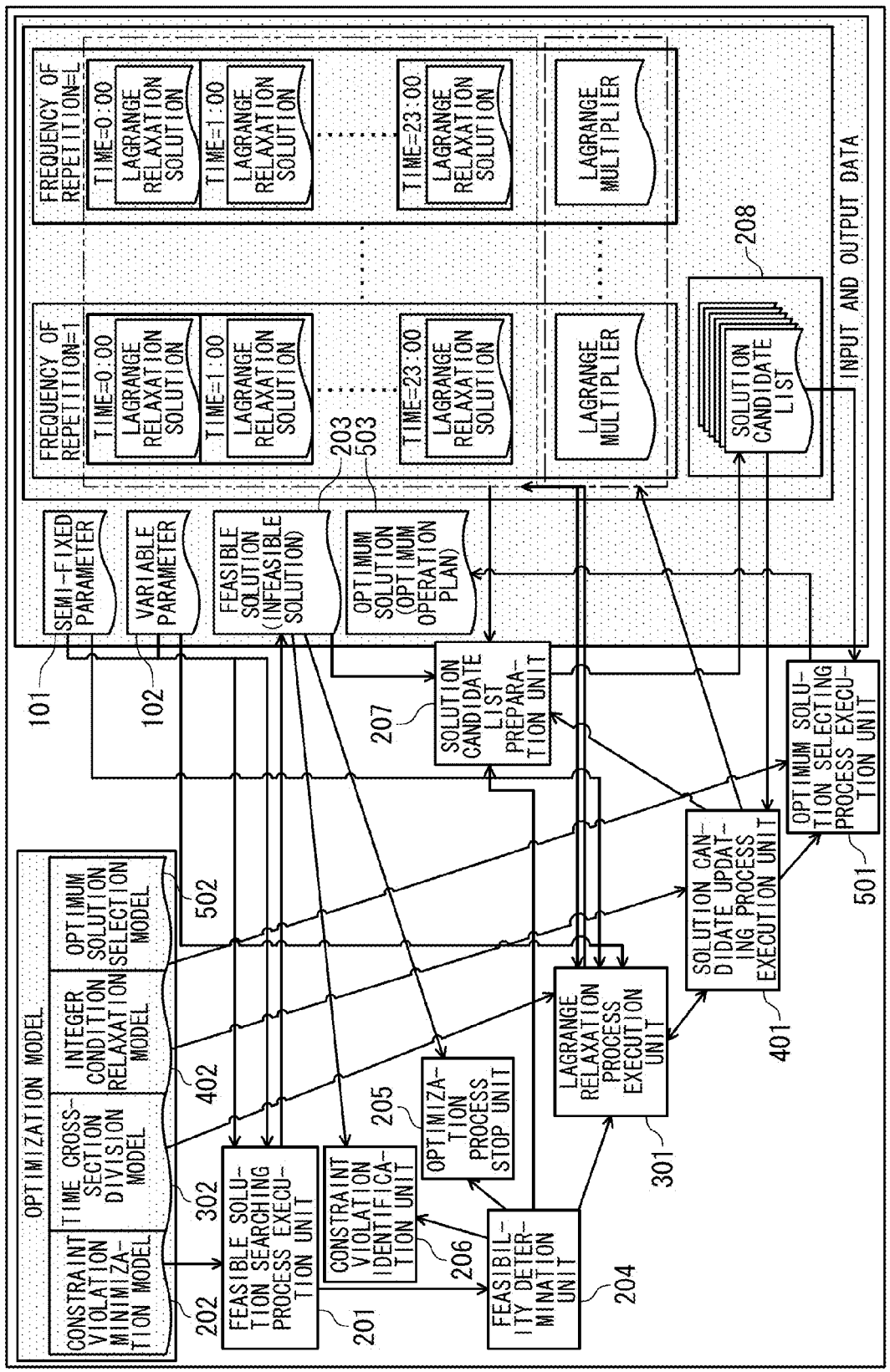
FIG. 1 is a block diagram illustrating an example of a configuration of an operation plan decision system.

FIG. 1 is a block diagram illustrating an example of a configuration of the operation plan decision system. Hereinafter, each element of the operation plan decision system according to the present invention will be described with reference to FIG. 1.

FIG. 1, a semi-fixed parameter 101 is an inherent parameter of the equipment such as a coefficient of performance or rated values of the equipment.

For example,
(1) coefficient of performance (COP)
(2) rated values (minimum input and output values, and maximum input and output values)
(3) various set values (a temperature, a vapor pressure, and the like)
(4) power consumption of auxiliary machines (a pump and the like)
(5) minimum operation time period and minimum stop time period
(6) start-up time A variable parameter 102 indicates current conditions of the plant (the equipment), and changes as time elapses.

For example,
(1) operation signal (0: stop and 1: operation)
(2) inoperable signal (0: operable and 1: inoperable)
(3) continuous operation time period and continuous stop time period
(4) current value (a temperature, a vapor pressure, and the like)
(5) information of demand side (an estimate value and an actual value)

An feasible solution searching process execution unit 201 is means for executing the optimization calculation by using a constraint violation minimization model 202 which will be described later in addition to the semi-fixed parameter 101 and the variable parameter 102. After the calculation is finished, an feasible solution 203 which will be described later is derived.

In comparison with the mixed integer linear programming (MILP) model of the related art, the constraint violation minimization model 202 is a model, an objective function of which is changed to the minimization of the amount of constraint violations from cost (the amount of $CO_2$ discharge) minimization.

The feasible solution 203 is a solution (is not equivalent to an optimum solution) that satisfies the constraint conditions. An optimum solution 503 is the best value in the feasible solution. When a solution does not satisfy the constraint conditions, the solution becomes an infeasible solution.

An feasibility determination unit 204 is means for determining existence or non-existence of the feasible solution 203 with reference to the value of the objective function (the amount of constraint violations) of the constraint violation minimization model.

An optimization process stop unit 205 is means for stopping the execution of the optimization process after it is determined that there is no feasible solution.

A constraint violation identification unit 206 is means for identifying equipment causing the constraint violation, the type of the constraint conditions, and a time slot, and correcting the constraint violation, with reference to the infeasible solution (when there is no feasible solution 203).

A solution candidate list preparation unit 207 is means for preparing a list (a solution candidate list 208 which will be described later) of candidates for the optimum solution by taking the feasible solution 203 as an initial value, and by adding Lagrange relaxation solutions in consecutive order.

The solution candidate list 208 is a list used by a solution candidate updating process execution unit 401 and an optimum solution selecting process execution unit 501 which will be described later, and takes discrete values.

A Lagrange relaxation process execution unit 301 is means for executing the optimization calculation by using a time cross-section division model 302 and a Lagrange multiplier, which will be described later, in addition to the semi-fixed parameter 101 and the variable parameter 102. After the calculation is finished, the Lagrange relaxation solution is derived.

The time cross-section division model 302 is a model divided for each time cross-section by applying a Lagrange relaxation method to the mixed integer linear programming (MILP) model (an original problem).

The Lagrange multiplier is a penalty multiplier used in the application of the Lagrange relaxation method, and typically is expressed by λ.

The Lagrange relaxation solution is referred to as a lower limit value for the original problem. The Lagrange relaxation solution is derived from the time cross-section division model 302.

The solution candidate updating process execution unit 401 is means for executing the optimization calculation by using an integer condition relaxation model 402, which will be described later, after the solution candidate list preparation unit 207 aggregates the Lagrange relaxation solutions in a time series, and adds the Lagrange relaxation solutions to the solution candidate list 208. After the calculation is finished, the Lagrange multiplier λ is derived.

The integer condition relaxation model 402 is the model of a primary problem of Lagrange dual problem. Since the integer condition relaxation model 402 is configured to have only the continuous variable, it is possible to obtain a solution for the integer condition relaxation model 402 by using a linear programming (LP) method.

The optimum solution selecting process execution unit 501 is means for executing the optimum calculation by using the solution candidate list 208 and an optimum solution selection model 502 which will be described later. A single solution is selected from the solution candidate list 208 for each time. After the calculation is finished, the optimum solution (an optimum operation plan) 503 which will be described later is derived.

The optimum solution selection model 502 is a discrete programming problem that is formed of the solution candidate list 208. A solution for the optimum solution selection model 502 is obtained by using a weighted constraint satisfaction problem (WCSP), which is a meta-heuristic method.

The optimum solution (the optimum operation plan) 503 is an optimum operation plan of the plant for cost saving and the reduction of the amount of $CO_2$ discharge. The equipment operation signal (the integer variable), the amount of input and output of the equipment (the continuous variable), and the like are derived in the time series.

Figure 2:
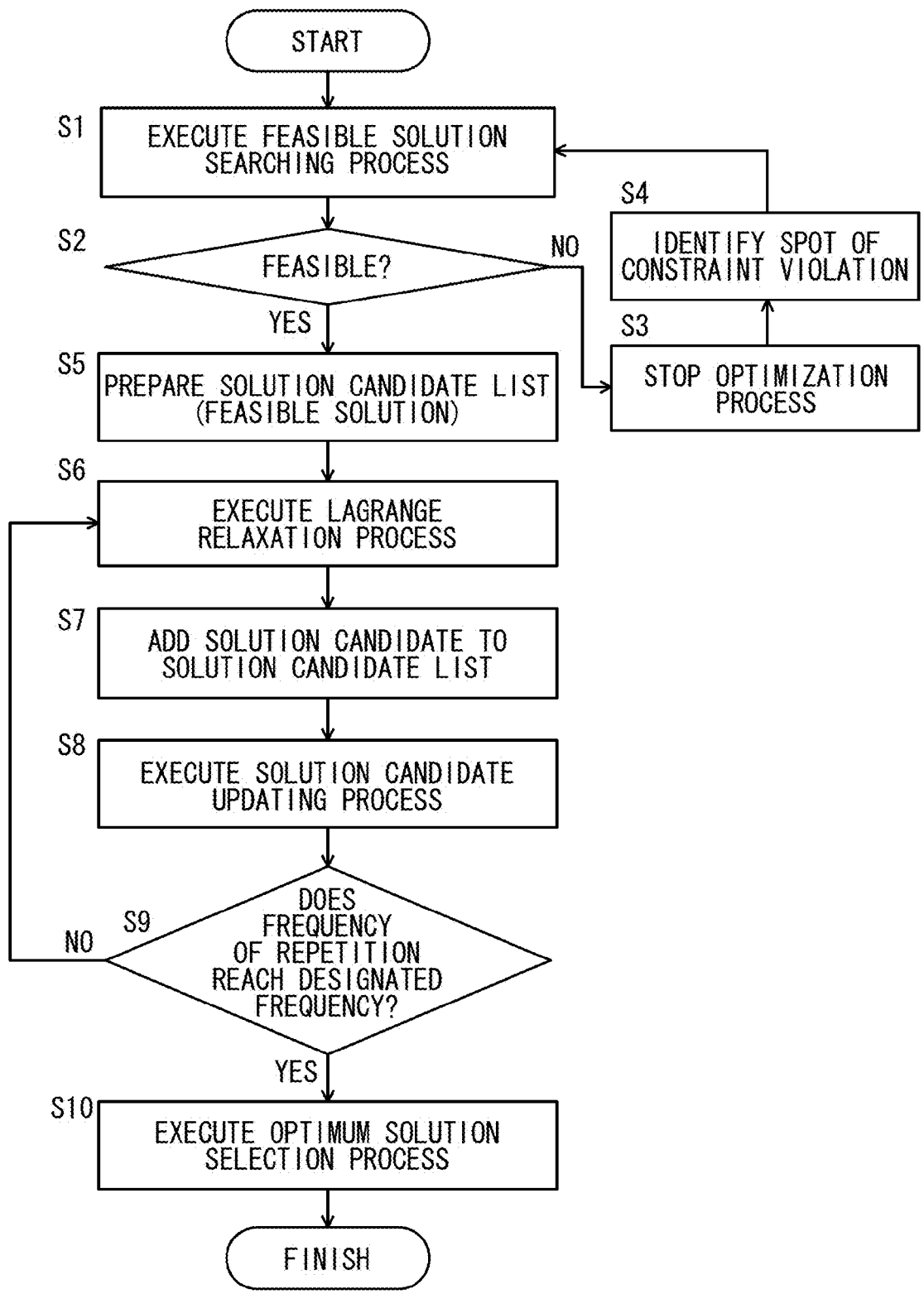
FIG. 2 is a flowchart illustrating an example of an operation of the operation plan decision system.

Subsequently, an operation of the operation plan decision system according to the embodiment of the present invention will be described. FIG. 2 is a flowchart illustrating an example of the operation of the operation plan decision system according to the embodiment of the present invention.

Feasible solution Searching Process (Step S1)

In step S1 illustrated in FIG. 2, the feasible solution searching process execution unit 201 executes the optimization calculation by using the semi-fixed parameter 101, the variable parameter 102, and the constraint violation minimization model 202. After the calculation is finished, the feasible solution 203 which will be described later is derived. Unlike the three optimization processes which will be described later, the objective function of the model is not the cost minimization, and this process becomes the basis for the warranty of feasibility. Hereinafter, an example of the constraint violation minimization model will be described.

Objective function:

$$\sum_{t \in Time} \sum_{e \in Energy} \sum_{f \in Facility} \left( \beta_{t,f}^{Demand,e} + \beta_{t,f}^{MinY,e} + \beta_{t,f}^{MaxY,e} + \beta_{t,f}^{MinRunTime} \right) \to \text{Minimize}$$

Equipment characteristics:

$$Y_{t,f}^e = \eta_f^e \cdot X_{t,f}^e + \varepsilon_f^e \cdot \delta_{t,f}$$

$$\delta_{t,f} \in \{0, 1\}$$

Constraint conditions (closed at time): in sequence, supply-demand balance constraint, output upper and lower limit constraints, and non-negative constraint (an example)

$$\sum_f Y_{t,f}^e - \alpha_{t,f}^{Demand,e} + \beta_{t,f}^{Demand,e} = Demand_t^e$$

$$MinY_f^e \cdot \delta_{t,f} = Y_{t,f}^e - \alpha_{t,f}^{MinY,e} + \beta_{t,f}^{MinY,e} = 0$$

$$Y_{t,f}^e = MaxY_f^e \cdot \delta_{t,f} - \alpha_{t,f}^{MaxY,e} + \beta_{t,f}^{MaxY,e} = 0$$

$$X_{t,f}^e, Y_{t,f}^e, \alpha_{t,f}^{Demand,e}, \alpha_{t,f}^{MinY,e}, \alpha_{t,f}^{MaxY,e}, \alpha_{t,f}^{MinRunTime},$$

$$\beta_{t,f}^{Demand,e}, \beta_{t,f}^{MinY,e}, \beta_{t,f}^{MaxY,e}, \beta_{t,f}^{MinRunTime} \geq 0$$

Constraint conditions (across time): minimum operation time period constraint (an example)

$$\sum_{u=t+1}^{t+N_f-1} \delta_{u,f} - (N_f - 1)(\delta_{t,f} - \delta_{t-1,f}) - \alpha_{t,f}^{MinRunTime} \beta_{t,f}^{MinRunTime} = 0$$

Continuous variable:

X: equipment input energy, Y: equipment output energy, α: slack variable, and β: artificial variable (constraint violation amount generation variable)

Integer variable:

δ: equipment operation signal (On/Off)

Parameter:

C: unit cost, η: coefficient of performance (COP), ε: the amount of bias, Demand: the amount of demand, MinY: minimum output rating, MaxY: maximum output rating, and N: minimum period of operation Subscript:

t: time step (examples: 1, 2, 3, . . . , 24), e: the type of energy, f: the number of equipment The constraint violation minimization model has the following three characteristics.

(1) A slack variable c' is added to the entirety of the constraint conditions, and thus the constraint conditions become equality constraint conditions.

(2) An artificial variable β is added to the constraint conditions so as to produce a value (a positive value) of when a constraint violation occurs. For example, in (A) of the following example, the artificial variable β becomes equal to zero, and the constraints of the supply-demand balance of energy are satisfied. In contrast, in (B), the artificial variable β becomes equal to a positive number, and a constraint violation occurs.

$$Y_t \geq \text{Demand}_t \Rightarrow Y_t - \alpha_t^{Demand} + \beta_t^{Demand} = \text{Demand}_t$$

$$(A) Y_t = 60, \text{Demand}_t = 40 \text{(Constraint observance)} \Rightarrow \alpha_t^{Demand} = 20, \beta_t^{Demand} = 0$$

$$(B) Y_t = 40, \text{Demand}_t = 60 \text{(Constraint violation)} \Rightarrow \alpha_t^{Demand} = 0, \beta_t^{Demand} = 20 \quad \text{[Expression 3]}$$

(3) The objective function is changed to the minimization of the artificial variable β (the minimization of the constraint violation) from energy cost minimization.

The usage of the constraint violation minimization model provides the following four merits.

(1) It is possible to determine existence or non-existence of the feasible solution only with reference to the objective function. That is, the objective function of becoming equal to zero indicates the fact that the feasible solution is obtained. The objective function of becoming equal to a positive value indicates the fact that the feasible solution is not obtained.

(2) The former case has at least one feasible solution that satisfies the entirety of the constraint conditions, and thus it is possible to warrant feasibility of the model.

(3) In the latter case, the artificial variable β enables the identification of the equipment, the constraint condition, and the time slot which cause the constraint violation.

(4) When a lower limit value becomes positive during the execution of the optimization calculation, there is no feasible solution even though the search is further performed. Accordingly, the calculation can be finished immediately. Since a solution, which satisfies the constraint conditions, is as good as, if not better than, the optimum solution that provides the best energy saving or the best reduction of the amount of $CO_2$ discharge, it is possible to execute the optimization calculation in a short time period.

Subsequently, in step S2, the feasibility determination unit 204 determines whether the feasible solution 203 is obtained. When the determination is YES, the process proceeds to step S5, and when the determination is NO, the process proceeds to step S3.

Stop of Optimization Process (step S3)

In step S3, the optimization process stop unit 205 stops the optimization process, and a transition to the latter part of the optimization process is stopped. Accordingly, in step S4, it is possible to begin to identify a spot of the constraint violation without waiting until the entirety of the optimization process is finished.

Identification of Constraint Violation Spot (Step S4)

In step S4, the constraint violation identification unit 206 identifies the equipment, the type of the constraint condition, and the time slot which cause an occurrence of the constraint violation. The identification method is performed according to the following procedures.

(1) The constraint violation identification unit 206 searches the artificial variable β in infeasible solutions, and finds a spot having the artificial variable β of a positive value.

(2) The constraint violation identification unit 206 confirms the constraint conditions under which the artificial variable β is used.

(3) The constraint violation identification unit 206 confirms the time slot in which the artificial variable β has a positive value.

According to the procedures described above, it is possible to simply identify the constraint violation spot. Furthermore, it is possible to estimate a cause of the constraint violation with ease. FIG. 3 illustrates an example of procedures of when the constraint violation spot is identified. In the example illustrated in FIG. 3, it is possible to identify a spot in which the constraint violation occurs according to the following procedures.

(1) It is recognized that the artificial variable of an amount of power demand is displayed in a column PD1 of FIG. 3, and indicates a positive value.

(2) It is recognized that the artificial variable is used in the supply-demand balance constraint conditions.

(3) It is recognized that the artificial variable indicates a positive value at time t=10, 11, . . . 15 in a time slot T1, and the constraint violation occurs in this time slot.

It is possible to estimate that the amount of power demand is erroneously set at time t=10, 11, . . . 15 in the time slot T1 based on the recognition described above. For example, confirmation of the estimation proves that the amount of demand is erroneously set to a value which is one digit larger than that of the correct amount of demand.

Preparation of Solution Candidate List (Step 5)

When the determination in step S2 is YES, in step S5, the solution candidate list preparation unit 207 prepares the solution candidate list 208 that takes the feasible solution 203 as an initial value. The solution candidates are sequentially added to this list at the latter part of the optimization process. Here, the solution derived via the optimization process certainly warrants feasibility of satisfying the entirety of the constraint conditions by having the feasible solution 203 as an initial value of the solution candidate list 208.

FIG. 4 is a diagram illustrating an example of the solution candidate list 208, and illustrates a case in which each of the minimum operation time period constraint and the minimum stop time period constraint is subjected to a five hour constraint. In this example, a "solution candidate 1", a "solution candidate 2", and a "solution candidate 3", which are added at the latter part of the optimization process, violate the minimum operation time period constraint or the minimum stop time period constraint. However, the solution candidate list 208 contains the feasible solution 203, that is, a solution candidate that does not violate the constraints. When the solution candidate list 208 contains the feasible solution as an initial value, it is possible to derive a solution satisfying the entirety of the constraint conditions even though only the infeasible solutions are added to the solution candidate list 208 as solution candidates. In contrast, when the solution candidate list 208 does not contain the feasible solution as an initial value, the solution candidates added to the list are derived in a state of the constraint conditions being relaxed. Accordingly, there is a probability that the solution candidate list 208 contains only the infeasible solutions which do not satisfy the entirety of the constraint conditions.

Lagrange Relaxation Process (Step S6)

Subsequently, in step S6, the Lagrange relaxation process execution unit 301 executes the optimization calculation by using the semi-fixed parameter 101, the variable parameter 102, the time cross-section division model 302, and the Lagrange multiplier (an initial value: 0). After the calculation is finished, the Lagrange relaxation solution is derived.

The time cross-section division model 302 is a model divided for each time cross-section by applying the Lagrange relaxation method to the mixed integer linear programming (MILP) model. Accordingly, in this process, the time cross-section division model 302 executes the optimization calculation at a frequency that corresponds to the number of time divisions. For example, when the time is divided into 24 steps, the optimization calculated is executed 24 times. Hereinafter, an example of the time cross-section division model is described.

Objective function: [Expression 4]

$$\sum_{t \in Time} \sum_{e \in Energy} \sum_{f \in Facility} (C_{t,f}^e)^T \cdot X_{t,f}^e - $$
$$\delta_{t,f} \left( \sum_{u=t-N_f+1}^{t-1} \lambda_{u,f} - (N_f - 1)(\lambda_{t,f} - \lambda_{t+1,f}) \right) \rightarrow Minimize$$

Equipment characteristics:

$$Y_{t,f}^e = \eta_f^e \cdot X_{t,f}^e + \varepsilon_f^e \cdot \delta_{t,f}$$

$$\delta_{t,f} \in \{0, 1\}$$

Constraint conditions (closed at time): in sequence, supply-demand balance constraint, output upper and lower limit constraints, and non-negative constraint (an example)

$$\sum_f Y_{t,f}^e \geq Demand_t^e$$

$$MinY_{t,f}^e \cdot \delta_{t,f} \leq Y_{t,f}^e \leq MaxY_{t,f}^e \cdot \delta_{t,f}$$

$$X_{t,f}^e, Y_{t,f}^e \geq 0$$

Continuous variable:
X: equipment input energy, Y: equipment output energy
Integer variable:
δ: equipment operation signal (On/Off)
Parameter:
λ: Lagrange multiplier, C: unit cost, η: coefficient of performance (COP), ε: the amount of bias, Demand: the amount of demand, MinY: minimum output rating, MaxY: maximum output rating, and N: minimum period of operation
Subscript:
t: time step (examples: 1, 2, 3, . . . , 24), e: the type of energy, f: the number of equipment The time cross-section division model has the following four characteristics.

(1) The constraint conditions across time are relaxed, and are set as the penalty function in the time cross-section division model (added to the objective function).

(2) The Lagrange multiplier λ is used as the penalty multiplier.

(3) When the penalty function is expanded, it is possible to divide the model into an independent problem each time.

(4) Since the constraint conditions are relaxed, solutions violating the constraints may be derived.

The usage of the time cross-section division model provides the following three merits.

(1) The time cross-section division model has only two search patterns of the integer variable per one piece of equipment. Accordingly, the total amount of search time becomes "two patterns×the number of equipment".

Figure 5:
FIG. 5 is a schematic diagram illustrating an amount of search time of a time cross-section division model.

(2) The aggregate amount of search time of the entirety of the time cross-section division model becomes "two patterns×the number of equipment×the number of time cross-section divisions (the number of time steps)". It is possible to not only avoid an exponential increase of the amount of search time as in the mixed integer linear programming method, but to also considerably suppress the amount of search time. FIG. 5 is a schematic diagram illustrating that the amount of search time of the time cross-section division model is "two patterns×the number of equipment×the number of time cross-section divisions (the number of time steps)". In FIG. 5, the equipment is lined up in a horizontal row, and the time steps are lined up in a vertical column. One of the integer variables (0 or 1) of two patterns are displayed in each frame of a matrix that is formed by the two elements.

Addition to Solution Candidate List (Step S7)

Subsequently, in step S7, the Lagrange relaxation solutions derived via the time cross-section division model are aggregated in times series and added to the solution candidate list 208 by the solution candidate list preparation unit 207.

Solution Candidate Updating Process (Step S8)

Subsequently, in step S8, the solution candidate updating process execution unit 401 executes the optimization calculation by using the integer condition relaxation model 402 after the Lagrange relaxation solutions are aggregated in times series and added to the solution candidate list 208 by the solution candidate list preparation unit 207. After the calculation is finished, the Lagrange multiplier is derived. The Lagrange relaxation process execution unit 301 uses an updated value of the Lagrange multiplier in the subsequent Lagrange relaxation process (step S6), and newly derived Lagrange relaxation solutions are added to the solution candidate list 208. The update of the Lagrange multiplier and the deriving of the Lagrange relaxation solution (the processes in step S6 to step S8) are repeatedly executed at a designated frequency. It is possible to arbitrarily set the designated frequency of the repetition.

Subsequently, in step S9, it is determined whether the frequency of repeating the processes in step S6 to step S8 reaches the aforementioned designated frequency. When the determination is YES, the process proceeds to step S10, and when the determination is NO, the process returns to step S6.

Subsequently, an example of the integer condition relaxation model will be described.

Objective function: [Expression 5]

$$\sum_{t \in Time} \sum_{e \in Energy} \sum_{f \in Facility} (C_{t,f}^e)^T \cdot X_{t,f}^e \rightarrow Minimize$$

Equipment characteristics:

$$\delta_{t,f} = \sum_h \delta_{t,f}^h \cdot U_{t,f}^h, \quad X_{t,f}^e = \sum_h X_{t,f}^{h,e} \cdot U_{t,f}^h,$$

$$Y_{t,f}^e = \sum_h Y_{t,f}^{h,e} \cdot U_{t,f}^h, \quad \sum_h U_{t,f}^h = 1, \quad 0 \leq U_{t,f}^h \leq 1$$

Constraint conditions (across time): minimum operation time period constraint (an example)

$$Const_{t,f}^{MinimumRunTime} = \sum_{u=t+1}^{t+N_f-1} \delta_{u,f} - (N_f - 1)(\delta_{t,f} - \delta_{t-1,f}) \geq 0$$

Lagrange multiplier $$\lambda_{t,f} = Dual(Const_{t,f}^{MinimumRunTime})$$

Continuous Variable:
$U^h$: optimum solution selection flag, $\delta$: equipment operation signal, X: equipment input energy, Y: equipment output energy Dual Variable (Dual):
$\lambda$: Lagrange multiplier Parameter:
$\delta^h$: solution candidate list (equipment operation signal),
$X^h$: solution candidate list (equipment input energy),
$Y^h$: solution candidate list (equipment output energy),
N: minimum operation time period Subscript:
t: time step (examples: 1, 2, 3, . . . , 24), e: the type of energy, f: the number of equipment, h: frequency of repetition (Lagrange relaxation process <-> solution candidate updating process)

The integer condition relaxation model has the following four characteristics.

(1) A variable value is obtained from the solution candidate list by using the optimum solution selection flag U.

(2) The constraint condition across time is defined not as the relaxation penalty but as the constraint condition.

(3) Since the optimum solution selection flag U is the continuous variable that changes between 0 and 1, the operation signal, the input energy, or the output energy also becomes the continuous variable, and is not the integer variable.

(4) The model is a primary problem of the Lagrange dual problem, and a dual variable value of the constraint condition across time is equivalent to the Lagrange multiplier $\lambda$.

Typically, when the Lagrange relaxation method is used, the Lagrange dual problem is used to derive (update) the Lagrange multiplier, but in the embodiment, the integer condition relaxation model is used. There are two reasons for the usage of the integer condition relaxation model.

(1) Since the integer condition relaxation model is a model of only the continuous variable, it is possible to execute the optimization calculation in a short time period by using the linear programming (LP) method.

(2) When the integer condition relaxation model is compared to the optimum solution selection model which will be described later, only a variable type of the optimum solution selection flag U is different between two models. Accordingly, since the solution candidate updating process and the optimum solution selection process can adopt almost the same model, the maintenance of the model is definitely easier compared to when the Lagrange dual problem is adopted.

Optimum Solution Selection Process (Step S10)

In step S10, the optimum solution selection process execution unit 501 executes the optimization calculation by using the solution candidate list 208 and the optimum solution selection model 502. After the calculation is finished, the optimum solution (the optimum operation plan) 503 is derived. In this process, the optimum solution selection process execution unit 501 selects a single solution from the solution candidate list 208 for each time, and builds the time series optimum operation plan. Finally, the optimum solution is derived to satisfy the entirety of the constraint conditions containing the Lagrange-relaxed constraint condition. Hereinafter, an example of the optimum solution selection model will be described.

Objective function [Expression 6]

$$\sum_{t \in Time} \sum_{e \in Energy} \sum_{f \in Facility} (C_{t,f}^e)^T \cdot X_{t,f}^e \rightarrow \text{Minimize}$$

Equipment characteristics $$\delta_{t,f} = \sum_h \delta_{t,f}^h \cdot U_{t,f}^h, \; X_{t,f}^e = \sum_h X_{t,f}^{h,e} \cdot U_{t,f}^h,$$

$$Y_{t,f}^e = \sum_h Y_{t,f}^{h,e} \cdot U_{t,f}^h, \; \sum_h U_{t,f}^h = 1, \; U_{t,f}^h \in \{0, 1\}$$

Constraint conditions (across time): minimum operation time period constraint (an example)

$$\sum_{u=t+1}^{t+N_f-1} \delta_{u,f} - (N_f - 1)(\delta_{t,f} - \delta_{t-1,f}) \geq 0$$

Integer variable (0 or 1):
$U^h$: optimum solution selection flag

Discrete Variable:
$\delta$: equipment operation signal, X: equipment input energy, Y: equipment output energy Parameter:
$\delta^h$: solution candidate list (equipment operation signal),
$X^h$: solution candidate list (equipment input energy),
$Y^h$: solution candidate list (equipment output energy),
N: minimum operation time period Subscript:
t: time step (examples: 1, 2, 3, . . . , 24), e: the type of energy, f: the number of equipment, h: frequency of repetition (Lagrange relaxation process <-> solution candidate updating process)

The optimum solution selection model has the following three characteristics and merits.

(1) As described above, the difference between the optimum solution selection model and the integer condition relaxation model is the variable type of the optimum solution selection flag U. The integer condition relaxation model is configured to have the continuous variable whereas the variable type is merely changed to the integer variable in the optimum solution selection model.

(2) A single optimum value of each variable is selected from the solution candidate list for each time. Since the optimum solution selection flag is the continuous variable when the integer condition relaxation model is adopted, the optimum value of each variable can be obtained by the following method. However, in this case, the obtained optimum value is excluded from the optimum solution.

$$\delta_{t,f} = \sum_h \delta_{t,f}^h \cdot U_{t,f}^h \Rightarrow \delta_{t,f}^1 \cdot 0.4 +, \quad \text{[Expression 7]}$$

$$\delta_{t,f}^5 \cdot 0.3 + \delta_{t,f}^{10} \cdot 0.3 \sum_h U_{t,f}^h = 0.4 + 0.3 + 0.3 = 1$$

(3) Since the optimum solution selection flag U is the integer variable of 0 or 1, the equipment operation signal, the input energy, or the output energy is not the continuous variable but the discrete variable. Accordingly, the optimum solution selection model is configured to have only the discrete variable, and it is possible to execute the optimization calculation in a short time period by adopting the "weighted constraint satisfaction problem (WCSP)" that has the advantage of the discrete programming problem.

Figure 6:
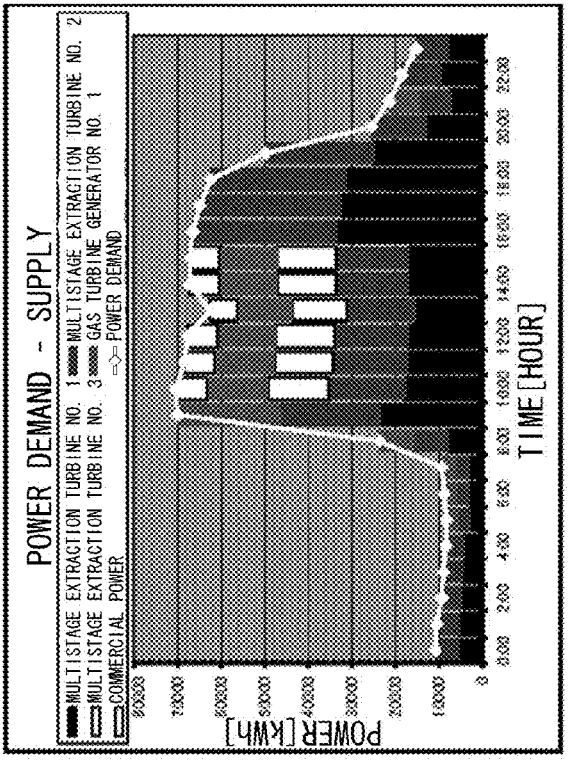
FIG. 6 is a diagram illustrating examples of a graph of time series data of an equipment energy output, and an illustration of an operation Gantt chart.

A graph of the amount of input and output of the equipment is prepared based on the optimum solution (the optimum operation plan) 503 derived by the optimum solution selection process execution unit 501, and an operation Gantt chart is prepared based on the equipment operation signal. The graph and the Gantt chart are used to support the operation of the plant, or used as control indication values. FIG. 6 illustrates examples of a graph of time series data of the equipment energy output, and an illustration of an operation Gantt chart. The time series data of the equipment energy output such as a total sum of the equipment energy output and details of each piece of equipment is illustrated by a bar graph. In the operation Gantt chart, the vertical axis indicates the equipment, and the horizontal axis indicates time. The Gantt chart illustrates an operation time slot for each piece of equipment.

The operation plan decision system according to the embodiment of the present invention can provide the optimum solution in a short time period (in a unit of minutes) which warrants feasibility of a large-scale and complicated model in which it takes a long time period (in a unit of hours, or in a unit of days) to execute the optimization calculation when the method of the related art is adopted, and in which even an feasible solution is not obtained, putting aside the optimum solution.

Since the operable optimum operation plan can be derived in a short time period, it is possible to provide a finer mesh (a unit of scheduling) of a plan to a supply-demand cooperation plant that is affected by byproducts. It is also possible to execute a scheduling task several times per day in association with a change of a production plan.

When the feasible solution is not obtained, it is possible to identify a spot of a constraint violation quickly without waiting until the entirety of the optimization process is finished. Accordingly, it is possible to considerably reduce man-hours for the development of a large-scale and complicated optimization model.

The time cross-section division model calculates the amount of search time of the integer variable in a polynomial expression of the number of equipment, the number of time cross-section divisions, and the frequency of the repetition of the Lagrange relaxation process and the solution candidate updating process, and it is possible to avoid an exponential increase of the amount of search time. Accordingly, the algorithm of the operation plan decision system according to the embodiment of the present invention is a polynomial time algorithm, and it is possible to estimate a calculation time period in association with the scale of a model. As a result, it is also possible to execute a scheduling task on a regular basis.

Since each time cross-section division model is an independent problem, it is possible to execute a parallelized calculation of the Lagrange relaxation process. Accordingly, it is possible to execute the calculation at an even higher speed.

The operation plan decision system according to the embodiment of the present invention adopts an algorithm in which the original problem model is modified, and the optimization calculation is executed. Accordingly, the plurality of optimization means is combined together, but each optimization means is not a different types of models. As a result, the maintenance of the model is easy. It is also possible to effectively use knowledge (development resources) obtained from the usage of the mixed integer linear programming model of the related art Second Embodiment Hereinafter, an operation plan decision system according to a second embodiment of the present invention will be described. An operation plan decision system 1 according to the second embodiment includes a model construction interface (I/F) unit 10 in addition to an optimum operation plan deriving unit 40 configured in the operation plan decision system according to the first embodiment. In the second embodiment, the same reference signs are assigned to the same configuration units as those of the first embodiment, and the descriptions of the same configuration units will be omitted.

Figure 7:
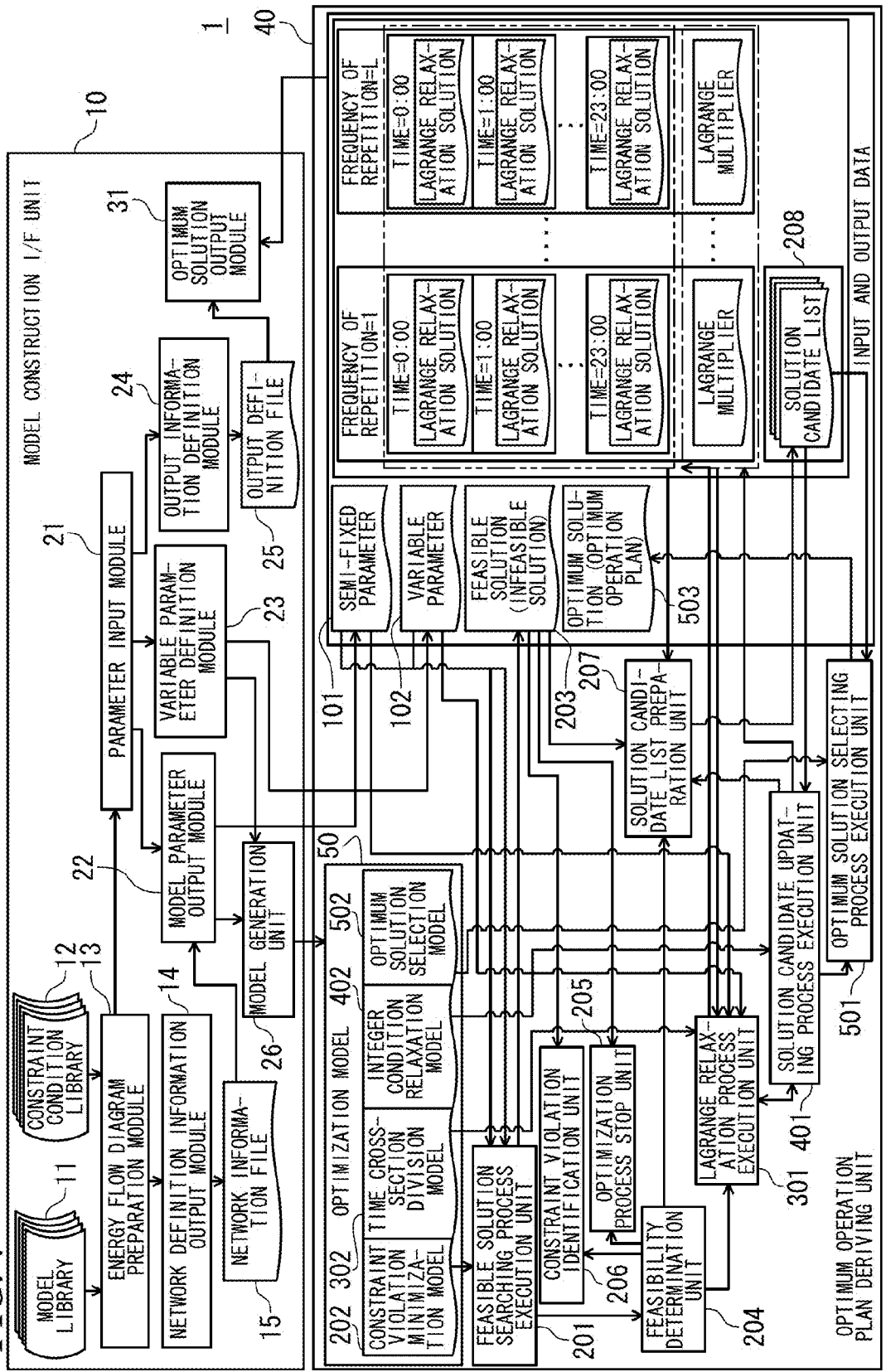
FIG. 7 is a block diagram illustrating an example of a functional configuration of the operation plan decision system 1.

FIG. 7 is a block diagram illustrating an example of a functional configuration of the operation plan decision system 1. The operation plan decision system 1 receives input from a user, generates the semi-fixed parameter 101 and the variable parameter 102 by using the model construction I/F 10, and generates each model to be contained in an optimization model 50, based on the generated semi-fixed parameter 101 and the generated variable parameter 102. The models contained in the optimization model 50 are the constraint violation minimization model 202, the time cross-section division model 302, the integer condition relaxation model 402, and the optimization solution selection model 502 which are described in the first embodiment. The operation plan decision system 1 derives the optimum solution based on the generated semi-fixed parameter 101, the generated variable parameter 102, the generated constraint violation minimization model 202, the generated time cross-section division model 302, the generated integer condition relaxation model 402, and the generated optimization solution selection model 502.

The operation plan decision system 1 includes the model construction I/F 10 and the optimum operation plan deriving unit 40.

The model construction I/F 10 includes a model library 11; a constraint condition library 12; energy flow diagram preparation module 13; network definition information output module 14; a network information file 15; parameter input module 21; model parameter output module 22; variable parameter definition module 23; output information definition module 24; an output definition file 25; a model generation unit 26; and optimum solution output module 31.

The model library 11 is a collection of program files in which equipment characteristics are described in model languages.

The constraint condition library 12 is a collection of files in which inherent constraint conditions of the equipment are described, or constraint conditions between the equipment can be also described.

The energy flow diagram preparation module 13 is an interface for preparing an energy flow diagram of a plant by using stencils (figures) and programs, each of which corresponds to each stencil. The energy flow diagram preparation module 13 is formed of macro programs such as Microsoft Visio. Insofar as the energy flow diagram preparation module 13 is an application capable of handling the figures with the stencils, and of corresponding various programs to the stencils, the energy flow diagram preparation module 13 may be formed of any other applications.

The energy flow diagram preparation module 13 includes the following 1) to 7) objects as the stencils.

1) Equipment objects (a generator, a boiler, heat source equipment, a heat storage tank, and the like)
2) Node objects (electricity, various vapors, hot and cold water, and the like)
3) Fuel objects (electricity, various vapors, hot and cold water, and the like)
4) Demand objects (electricity, various vapors, hot and cold water, and the like)
5) Connector objects (electricity, various vapors, hot and cold water, and the like)
6) Constraint condition definition objects (generation, registration, and selection of constraint conditions between equipment)
7) Pallets (connection objects between a plurality of pages)

When the user disposes any one of the aforementioned objects on a work sheet, the energy flow diagram preparation module 13 outputs to the parameter input module 21, information indicative of the disposed object. When the user prepares the energy flow diagram of the plant on the work sheet by using those objects, the energy flow diagram preparation module 13 outputs to the network information file 15, information indicative of the prepared energy flow diagram. The energy flow diagram is a chart illustrating the flow of energy between the equipment of the plant.

When the network definition information output module 14 acquires the information indicative of the energy flow diagram from the energy flow diagram preparation module 13, the network definition information output module 14 defines energy network information of the acquired energy flow diagram, and outputs the defined energy network information to the network information file 15.

The network information file 15 is information indicative of connections between the equipment in the energy flow diagram, and information indicative of the flow (an input and output) of energy between the connected equipment.

The parameter input module 21 is an interface for receiving a parameter from the user, which corresponds to each object that the user disposes on the work sheet by using the energy flow diagram preparation module 13. The parameter input module 21 is formed of macro programs such as Microsoft Excel. Insofar as the parameter input module 21 is an application capable of operating in association with the energy flow diagram preparation module 13, and of generating a graphical user interface (GUI)-based input work sheet, the parameter input module 21 may be formed of any other applications.

When the parameter input module 21 acquires the information indicative of the object from the energy flow diagram preparation module 13, the parameter input module 21 generates the work sheet (hereinafter, referred to as the input work sheet) on which the parameter corresponding to the object is input based on the acquired information indicative of the object. When the object are deleted by the energy flow diagram preparation module 13, the parameter input module 21 deletes the input work sheet that correspond to the deleted object. The input work sheet is an example of the parameter input screen.

The parameter input module 21 outputs to the model parameter output module 22 and the variable parameter definition module 23, the information indicative of various parameters input via the input work sheet by the user. The parameter input module 21 outputs to the output information definition module 24, information (hereinafter, referred to as display position information) indicative of a position on the work sheet, which is determined for each input work sheet so as to display the optimum solution. The display position indicated by the display position information is an example of a predetermined position on the parameter input screen.

When the model parameter output module 22 acquires the information indicative of the parameter from the parameter input module 21, the model parameter output module 22 reads the network information file 15, and generates the semi-fixed parameter 101 based on the information indicative of the parameter and the network information file 15. The model parameter output module 22 outputs the generated semi-fixed parameter 101 to the model generation unit 26 and the optimum operation plan deriving unit 40.

When the variable parameter definition module 23 acquires the information indicative of the parameter, the variable parameter definition module 23 generates the variable parameter 102 based on the information indicative of the parameter. The variable parameter definition module 23 outputs the generated variable parameter 102 to the model generation unit 26 and the optimum operation plan deriving unit 40.

The model generation unit 26 acquires the semi-fixed parameter 101 from the model parameter output module 22, and acquires the variable parameter 102 from the variable parameter definition module 23. The model generation unit 26 generates the constraint violation minimization model 202, the time cross-section division model 302, the integer condition relaxation model 402, and the optimum solution selection model 502 based on the acquired the semi-fixed parameter 101 and the acquired variable parameter 102. The model generation unit 26 outputs the generated constraint violation minimization model 202, the generated time cross-section division model 302, the generated integer condition relaxation model 402, and the generated optimum solution selection model 502 to the optimum operation plan deriving unit 40.

When the output information definition module 24 acquires the display position information from the parameter input module 21, the output information definition module 24 outputs the acquired display position information as the output definition file 25.

The optimum solution output module 31 acquires the optimum solution 503 from the optimum operation plan deriving unit 40. The optimum solution 503 acquired by the optimum solution output module 31 is displayed on the input work sheet based on the output definition file 25.

Figure 8:
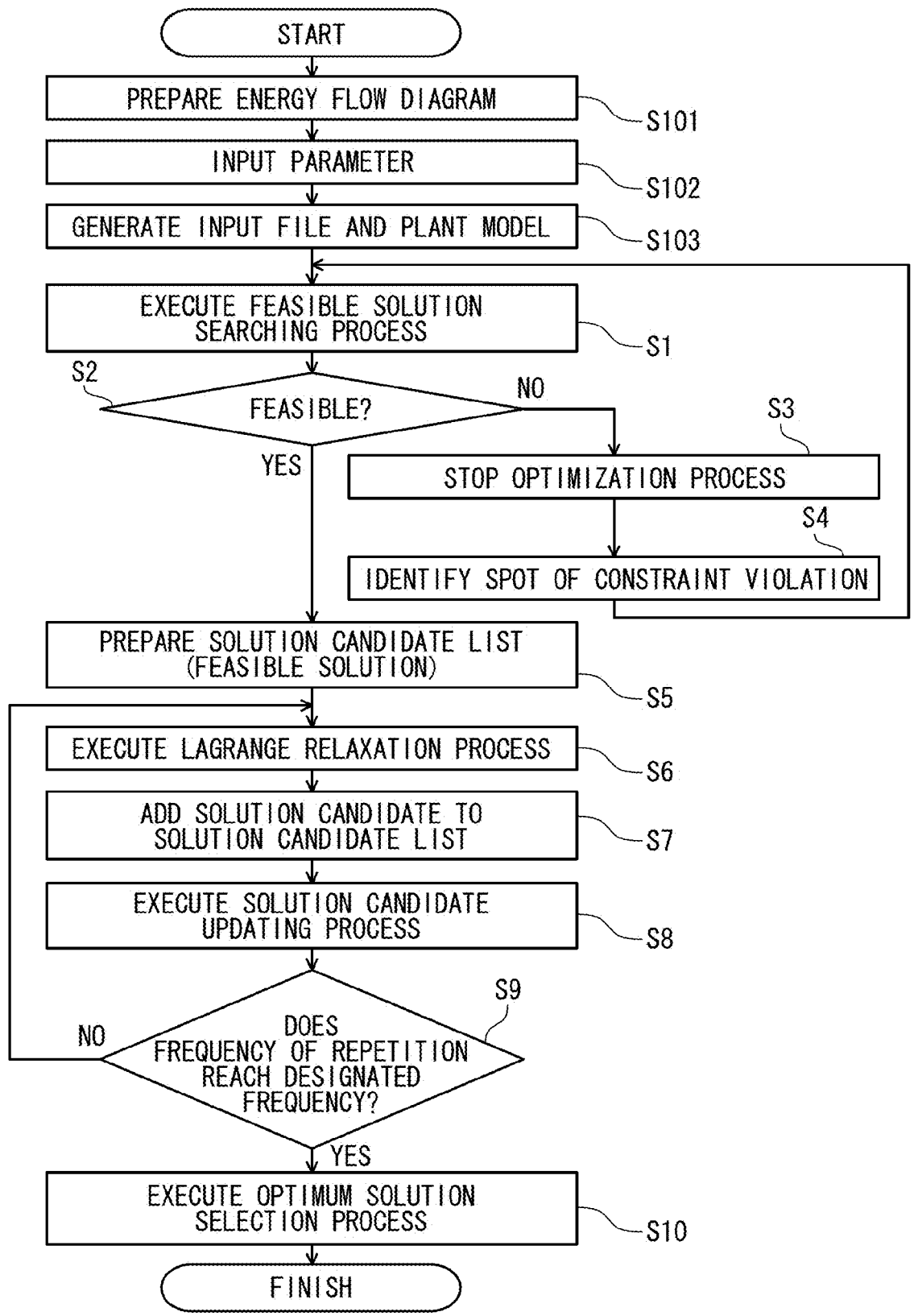
FIG. 8 is a flowchart illustrating an example of a flow of a process in which the operation plan decision system 1 outputs an optimum solution.

Hereinafter, a flow of a process, in which the operation plan decision system 1 outputs the optimum solution, will be described with reference to FIG. 8. FIG. 8 is a flowchart illustrating an example of the flow of the process in which the operation plan decision system 1 outputs the optimum solution. Since processes in step S1 to step S10 are the same as those in step S1 to step S10 illustrated in FIG. 2, the descriptions thereof will be omitted.

Figure 9B:
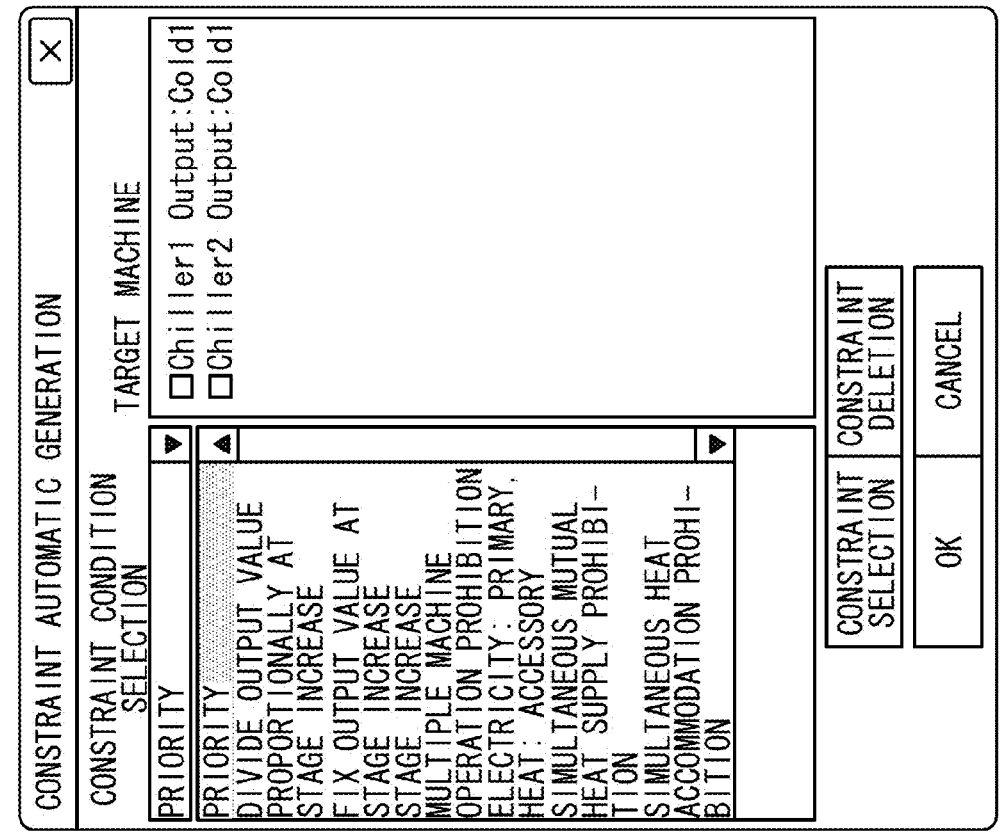
FIGS. 9A and 9B are block diagrams illustrating an example of a state in which an energy flow diagram is prepared by an energy flow diagram preparation module 13.
Figure 9A:
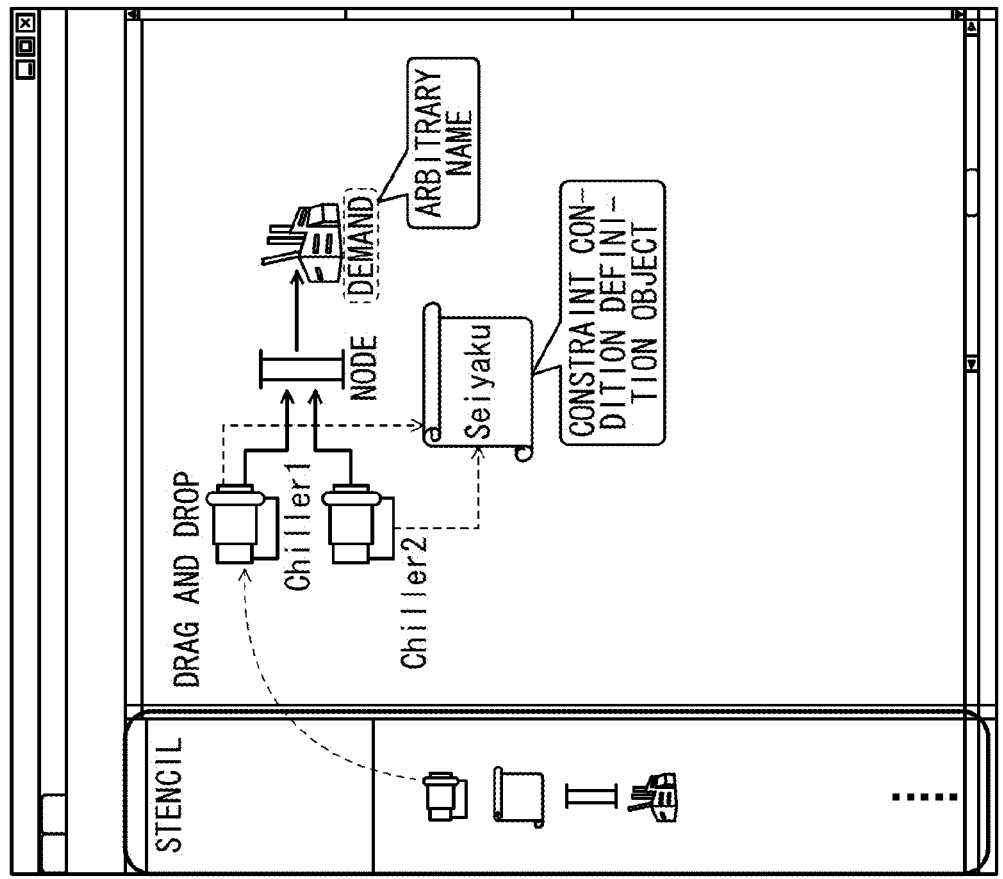

First, the model construction I/F unit 10 receives an input via the energy flow diagram preparation module 13 by the user, and prepares the energy flow diagram (step S101). Herein, a preparation process of the energy flow diagram via the energy flow diagram preparation module 13 will be described with reference to FIGS. 9A and 9B. FIGS. 9A and 9B are block diagrams illustrating an example of a state in which the energy flow diagram is prepared by the energy flow diagram preparation module 13. FIG. 9A illustrates an example of a state in which the user prepares the energy flow diagram of the plant by disposing the object registered as the stencil of Microsoft Visio on the work sheet by means of a drag and drop function.

The energy flow diagram preparation module 13 generates a GUI illustrated in FIG. 9A, and the user prepares the energy flow diagram via the energy flow diagram preparation module 13 by using the generated GUI. The user prepares the entire chart of the plant on the work sheet by connecting the equipment object, the node object, and the like via the connector object. The user can impose the constraint conditions between the objects connected via the connector object by disposing the constraint condition definition object between the objects, for example, between the equipment objects via the connector object.

Furthermore, the energy flow diagram preparation module 13 generates a constraint condition list screen illustrated in FIG. 9B. The user can select, register, and delete the constraint conditions between the objects via the constraint condition list screen.

Subsequently, various parameters corresponding to the objects disposed on the energy flow diagram are input to the model construction I/F unit 10 via the parameter input module 21 by the user (step S102). Herein, the input work sheet generated by the parameter input module 21 will be described with reference to FIG. 10. FIG. 10 illustrates an example of the input work sheet generated by the parameter input module 21.

As illustrated in FIG. 10, the parameter input module 21 generates an equipment rated-value input column (a mandatory input item), which corresponds to each object, as the input work sheet, and a constraint condition set column (an arbitrary input item) as a parameter input column on the work sheet. The parameter input module 21 generates an optimization calculation result output column on the work sheet so as to display the optimum solution derived corresponding to the input parameter. The user can display the optimum solution for the plant in the optimization calculation result output column via the operation plan decision system 1 by inputting various parameters corresponding to each object via the input work sheets, and by starting a calculation of deriving the optimum solution (for example, by selecting an optimum solution deriving calculation start from a right-click menu). Since a process of deriving the optimum solution via the optimum operation plan deriving unit 40 is the same as that of the first embodiment, the description thereof will be omitted.

As described above, since the model construction I/F unit 10 derives the optimum solution based on the parameter input from the user, and displays the derived optimum solution, the operation plan decision system 1 according to the second embodiment can provides the same effects as those of the first embodiment. In addition, it is possible to easily generate the constraint violation minimization model 202, the time cross-section division model 302, the integer condition relaxation model 402, and the optimum solution selection model 502, compared to when the operation plan decision system is not configured to include the model construction I/F unit 10. As a result, the operation plan decision system 1 can provide the user with an environment in which the user can change an interval of deriving the operation plan with ease.

The applicable range of the present invention is not limited to the embodiments described above.

For example, the present invention enables a general optimization model to be constructed, and can be applied to a model builder that automatically executes an optimization process function and a preparation of model programs.

The parallelized calculation of the Lagrange relaxation process can be performed. Accordingly, even though a large number of meshes (the number of time cross-section divisions) are applied, it is possible to finish the process in the same calculation time period by simultaneously executing calculations corresponding to the number of time cross-section divisions via the operation plan decision system loaded on a cloud system. At this time, it is possible to execute a finer scheduling task.

In a virtual fabrication in which a foundry company and a fabless company work in cooperation with each other, which is observed in a semiconductor industry, it is necessary to prepare a production schedule through which operations between a large number of companies, between production equipment, and between production processes, and an interest between companies are adjusted. It is estimated that a scale of problems becomes large-scale and complicated in the preparation of the production schedule, but the problems can be solved by the present invention.

The present invention can be applied to an elevator group management system of a skyscraper, and a multi-portfolio optimization problem.

Since the present invention can be applied to a mixed integer nonlinear programming (MINLP) method, the present invention can provide a warranty of feasibility and an optimum solution in a short time period for a large-scale and complicated model which is defined more elaborately.

What is claimed is:

1. An operation plan decision method, executed by a computer, in which an operation plan is determined to satisfy constraint conditions, the method comprising:
   deriving a feasible solution by using a constraint violation minimization model;
   updating candidates for an optimum solution and adding the updated candidates to a candidate list by taking the derived feasible solution, as an initial value of a candidate for the optimum solution, and by using a time cross-section division model that is obtained by dividing an optimization model for each time cross-section; and
   selecting, as the operation plan, the optimum solution that is a feasible solution for a large-scale and complicated plant model, from the candidate list to which the updated candidates are added, the operation plan being used for executing a scheduling task.

2. The operation plan decision method according to claim 1, further comprising:
   identifying a spot of a constraint violation for an infeasible solution when the feasible solution cannot be derived.

3. The operation plan decision method according to claim 1,
   wherein when the feasible solution cannot be derived, the execution of the candidate updating is stopped.

4. The operation plan decision method according to claim 1, further comprising:
   preparing an energy flow diagram indicative of the flow of energy between equipment, based on figures indicative of the equipment;
   generating a parameter input screen to correspond to the figures, and receiving parameters corresponding to the figures from the generated parameter input screen; and
   generating the constraint violation minimization model, the time cross-section division model, an integer condition relaxation model, and an optimum solution selection model based on the parameters corresponding to the figures, which are received via the parameter input screen.

5. The operation plan decision method according to claim 1, further comprising:
outputting the selected optimum solution.

6. The operation plan decision method according to claim 5,
wherein the selected optimum solution is output at a predetermined position on the parameter input screen.

7. An operation plan decision system in which an operation plan is determined to satisfy constraint conditions, the operation plan decision system comprising:
a computer configured to execute:
a feasible solution deriving module configured to derive a feasible solution by using a constraint condition minimization model;
a candidate updating module configured to update candidates for an optimum solution and adding the updated candidates to a candidate list by taking the feasible solution derived by the feasible solution deriving module, as an initial value of a candidate for the optimum solution, and by using a time cross-section division model that is obtained by dividing an optimization model for each time cross-section; and
an optimum solution selection module configured to select, as the operation plan, the optimum solution that is a feasible solution for a large-scale and complicated plant model, from the candidate list obtained by the candidate updating module, the operation plan being used for executing a scheduling task.

8. The operation plan decision system according to claim 7, further comprising:
a constraint violation identification module configured to identify a spot of a constraint violation for an infeasible solution when the feasible solution cannot be derived by the feasible solution deriving module.

9. The operation plan decision system according to claim 7,
wherein when the feasible solution cannot be derived by the feasible solution deriving module, the execution of the candidate updating module is stopped.

10. The operation plan decision system according to claim 7, further comprising:
an energy flow diagram preparation module configured to prepare an energy flow diagram indicative of the flow of energy between equipment, based on figures indicative of the equipment;
a parameter input module configured to generate a parameter input screen to correspond to the figures, and receiving parameters corresponding to the figures from the generated parameter input screen; and
a model generation module configured to generate the constraint violation minimization model, the time cross-section division model, an integer condition relaxation model, and an optimum solution selection model based on the parameters corresponding to the figures, which are received via the parameter input screen.

11. The operation plan decision system according to claim 7, further comprising:
an optimum solution output module configured to output the optimum solution selected by the optimum solution selection module.

12. The operation plan decision system according to claim 11,
wherein the optimum solution output module outputs the optimum solution at a predetermined position on the parameter input screen.

* * * * *